United States Patent [19]

Rattmann et al.

[11] Patent Number: 5,256,018
[45] Date of Patent: Oct. 26, 1993

[54] CLIP-ON FASTENER

[75] Inventors: Hans R. Rattmann, Burlington, Canada; James P. Clinch, Farmington Hills, Mich.; James H. Laarman, Chicago, Ill.

[73] Assignee: Eaton Corporation, Cleveland, Ohio

[21] Appl. No.: 971,007

[22] Filed: Nov. 2, 1992

[51] Int. Cl.$^5$ .................. F16B 37/02; F16B 37/04
[52] U.S. Cl. .................. 411/175; 411/112; 411/291
[58] Field of Search ............ 411/111, 112, 174, 175, 411/290, 291, 527

[56] References Cited

U.S. PATENT DOCUMENTS

| | | |
|---|---|---|
| 2,062,685 | 12/1936 | Timmerman . |
| 2,581,481 | 1/1952 | Hartmann et al. . |
| 2,672,905 | 3/1954 | Hartmann et al. . |
| 3,308,708 | 3/1967 | Holton . |
| 3,358,729 | 12/1967 | Munse . |
| 3,414,035 | 12/1968 | Munse . |
| 3,426,818 | 2/1969 | Derby . |
| 3,669,170 | 6/1972 | Schuster . |
| 4,200,027 | 4/1980 | Ochlke . |
| 4,440,535 | 4/1984 | Oehlke .................. 411/174 X |
| 4,508,477 | 4/1985 | Ochlke et al. .......... 411/174 |
| 4,714,392 | 12/1987 | Muller et al. .......... 411/175 |
| 4,729,706 | 3/1988 | Peterson et al. ........ 411/175 |

FOREIGN PATENT DOCUMENTS 24890 12/1982 France .
2102905 2/1983 United Kingdom .

*Primary Examiner*—Neill R. Wilson
*Attorney, Agent, or Firm*—A. E. Chrow

[57] ABSTRACT

A clip on fastener (100) is provided that features a pair of spaced apart legs (2) and (6) extending from a closed end (9) to an open end (10) of fastener (100). Leg (6) includes a pair of resilient arms (16 and 18) that extend away from the side of the leg (6) facing away from leg (2) and end in overhanging relationship to an opening (7) through arm (16). Arm (18) extends towards closed end (9) and includes a guide tab (20) that extends angularly away from leg (2) towards open end (10). Tab (20) is operative to initiate separation of legs (2 and 6) to enhance receipt of an edge of a panel or plate (P) into open end (10).

2 Claims, 1 Drawing Sheet

CLIP-ON FASTENER

This invention relates generally to a clip-on type fastener and more particularly to a clip-on type fastener that includes a tab operative to engage one edge of a panel member and initiate spread of the fastener's legs to enhance receipt of the panel member into the open-end of the fastener.

BACKGROUND OF THE INVENTION

Clip-on type fasteners have been used for many years for example to provide a means for threadingly securing a threaded member to a panel.

Certain of such prior art fasteners have also heretofor featured one leg end flared or bent angularly away from the other to enhance spreading the legs apart by a panel or plate edge as previously described. Examples of such are disclosed in U.S. Pat. Nos. 2,062,685; 2,672,905; 3,414,035; 3,358,729; 3,426,818; 3,669,170; 4,200,027; 4,508,477 and French patent 2489-903 and in published British Patent Application GB 2102905A, the disclosures of which are included herein by reference.

Certain of the prior art patents also disclose clip-on type fasteners having the end of one leg flared or bent away from the other leg as previously described in combination with the other leg including an angularly bent tab for centering the securement part of the fastener within an opening through the panel of which examples can be found in previously described U.S. Pat. Nos. 2,672,905; 3,426,818; 3,669,170; 4,509,477 and in French Patent 2489-903 and British Patent Application GB 2102905A.

In some instances, such clip-on type fasteners have also heretofor that featured the centering tab without one of the leg ends being flared or bent away from the other at its end such as disclosed in U.S. Pat. Nos. 2,581,481 and 4,714,392, the disclosures of which are incorporated herein by reference.

Yet another example of a clip-on type fastener having both of the leg ends flared or bent away from each other to ease spread apart of the legs upon engagement with one edge of a panel or plate is disclosed in U.S. Pat. No. 3,308,708, the disclosure of which is incorporated herein by reference and that, along with Pat. Nos. 2,062,685; 2,672,905; 3,308,708; 4,200,027 and 4,508,477, are assigned to the assignee of the present invention.

However, none of the clip-on type fasteners heretofore described have featured the inclusion of a tab extending from one of a pair of resilient arms overhanging one of the legs to act as a guide to provide a means for engaging a panel or plate edge to ease spread apart of the legs rather than having an end of one or both of the legs bent or flared away from the other therefor enabling the end of the leg to provide a broader base from which the resilient arm extends.

SUMMARY OF THE INVENTION

Accordingly, it is an object of this invention to provide a clip-on type fastener provided with means to enhance receipt of an edge of a panel or plate into the open end thereof.

It is another object of this invention to provide a clip on type fastener having means for enhancing the spread of its legs for receipt of an edge of a panel or plate into the open end thereof that is not predicted upon bending or flaring an end of one or both of the legs away from the other.

It is still another object of this invention to provide a clip on type fastener featuring a guide tab extending from one of a pair of resilient overhanging arms that is operative to act as a guide and facilitate the spread apart of its legs for receipt of an edge of a panel or plate into the open end thereof.

DESCRIPTION OF SOME PREFERRED EMBODIMENTS

Figure 1:
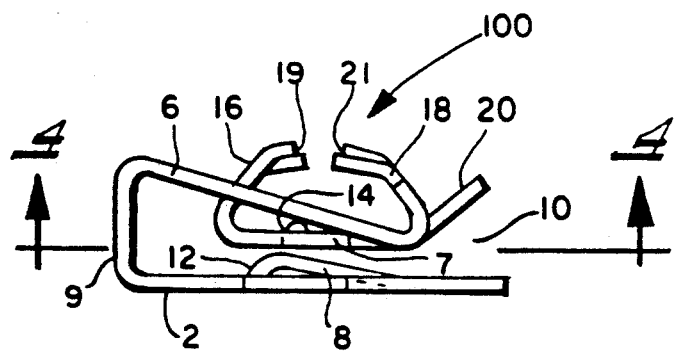
FIG. 1 is a side elevation view of an embodiment of the clip on fastener of the invention referenced by numeral 100.

Fastener 100 of FIG. 1 is made from a resilient material such as a suitable spring steel and is preferably a one piece construction that is bent, trimmed and punched into the configuration shown in the drawings from a thin (such as 0.030 inch) strip or sheet of the material.

Fastener 100 has a first leg referenced by numeral 2 that is spaced apart from a second leg 6. Legs 2 and 6 extend from a closed end referenced by numeral 9 to an open end referenced by numeral 10.

Figure 3:
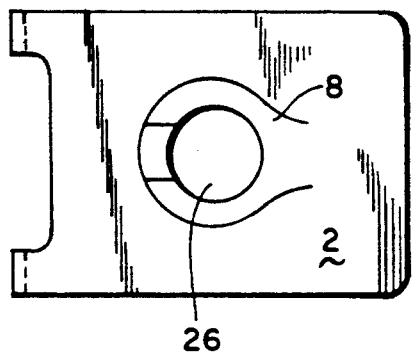
FIG. 3 is a bottom elevation view of fastener 100 of FIG. 1.

Leg 2 includes a centering tab 8 shown in FIGS. 1 and 3 that extends angularly towards closed end 9 from the side of leg 2 facing towards leg 6. The free end of tab 8 is preferably bent downwardly in a direction away from leg 6 as referenced by numeral 12. Tab 8 has an opening 26 therethrough that is operative to receive a threaded member therethrough such as screw 30 shown in FIG. 5.

Figure 4:
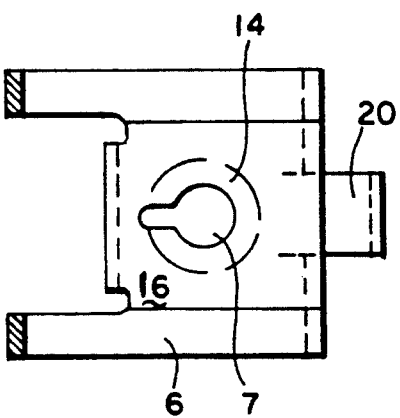
FIG. 4 is a view of fastener 100 taken along view line 4—4 of FIG. 1.
Figure 5:
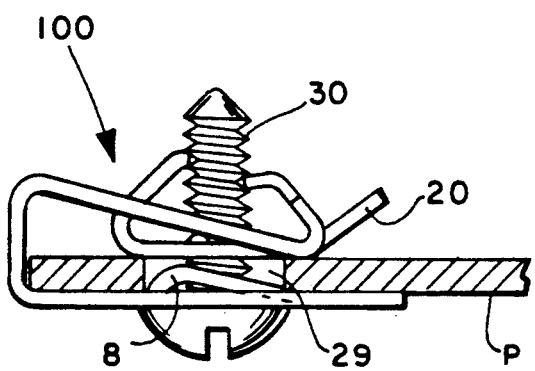
FIG. 5 is a side elevation of fastener 100 of FIG. 1 secured to a panel referenced by letter "P".

As shown in FIG. 5, when fastener 100 is clipped onto a panel or plate such as referenced by letter "P", tab 8 is operative to snap into opening 29 and center fastener 100 for receipt of screw 30 through opening 26. A pair of opposed resilient arms 16 and 18 extend from a side of leg 6 facing away from leg 2 and in overhanging relationship to an opening 7 through leg 6. Opening 7 is substantially axially aligned with opening 26 through centering tab 8 is surrounded by a frusto-conical projection 14 shown in FIGS. 1 and 4 that has a warped helical edge (not referenced) that is adapted to threadingly engage the threads of the threaded member inserted through openings 26 and 7.

Arms 16 and 18 respectively end in spaced apart facing free ends 19 and 21 above opening 7. As the threaded member is rotationally advanced through opening 7, it enters the space between free ends 19 and 21 the edges respectively of which are also adapted to threadingly engage the threads of the threaded member.

Free ends 19 and 21 preferably include respective arcuate recesses 22 and 24 that are operative to enable the free ends to partially circumscribe the threaded member as it rotationally advances through the space between free ends 19 and 21.

Leg 18 further includes a guide tab 20 that extends angularly away from leg 2 in a direction towards open end 10. Tab 20 is thus bent or flared in a direction away from leg 2 to enhance receipt of the edge of the panel in plate onto which fastener 100 is to be clipped.

As shown in FIG. 5, an edge of panel or plate "P" has already been received into the open end of fastener 100 to the point where centering tab 8 has snapped into hole 29 through panel "P" so that openings 26 and 7 are in substantial axial alignment so that a threaded member can be secured to panel or plate "P" by rotationally advancing through openings 8 and of fastener 100.

Figure 2:
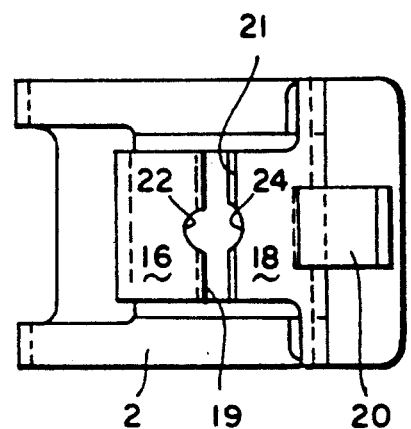
FIG. 2 is a top elevation view of fastener 100 of FIG. 1.

As can be seen in FIG. 2, one of the great advantages of having tab 20 extend from arm 18 rather than leg 6 is that it enables arm 18 to have a broader base from which to extend from leg 6.

What is claimed is:

1. A clip on type fastener having first and second spaced apart legs extending from a closed end to an open end operative to receive an edge of a panel member thereinto for securement of threaded member receivable through an opening through the panel member, said fastener having;

a centering tab extending angularly from a side of the first leg facing towards the second leg in a direction towards the closed end of the fastener, said centering tab having an opening operative to receive the threaded member therethrough upon registration of the centering tab with the panel member opening, a pair of opposed resilient arms respectively extending from the second leg in overhanging relationship to a side of the second leg facing away from the first leg and ending thereover in respective spaced apart free ends adapted to threadingly engage the threaded member with one of said arms extending from the second leg in a direction towards the closed end of the fastener and the other of said arms extending from the second leg in a direction towards the open end of the fastener, an opening through the resilient arm that extends towards the closed end of the fastener, said opening substantially axially aligned with the centering tab opening and surrounded by a frusto-conical projection extending from a side of said resilient arm facing away from the first leg and ending in a helical edge surrounding the opening through the second leg that is operative to threadingly engage the threaded member, and a guide tab extending from the resilient arm that extends towards the closed end of the fastener, said guide tab extending angularly from said arm in a direction away from the first leg and operative to engage the panel edge to enhance the receipt thereof into the opening of the fastener.

2. The fastener of claim 1 wherein the resilient arm free ends respectively include arcuate recesses therein operative to enhance threaded engagement with the threaded member.

* * * * *